United States Patent [19]

Ueda et al.

[11] Patent Number: 5,714,016
[45] Date of Patent: Feb. 3, 1998

[54] GEAR FOR WHEEL SPEED DETECTION AND METHOD OF MANUFACTURING THE SAME

[75] Inventors: Hiroshi Ueda; Naoki Inui; Yoshinobu Takeda, all of Itami, Japan

[73] Assignee: Sumitomo Electric Industries, Ltd., Osaka, Japan

[21] Appl. No.: 244,452

[22] PCT Filed: Sep. 29, 1993

[86] PCT No.: PCT/JP93/01385

§ 371 Date: May 25, 1994

§ 102(e) Date: May 25, 1994

[87] PCT Pub. No.: WO94/07630

PCT Pub. Date: Apr. 14, 1994

[30] Foreign Application Priority Data

Sep. 24, 1993 [JP] Japan .................. 5-237726
Sep. 29, 1993 [JP] Japan .................. 4-261124

[51] Int. Cl.⁶ .................. C23C 26/00; B23F 3/24; F16H 55/00
[52] U.S. Cl. .................. 148/246; 428/472.3
[58] Field of Search .................. 148/246; 428/472.3

[56] References Cited

U.S. PATENT DOCUMENTS

| | | | |
|---|---|---|---|
| 1,592,102 | 7/1926 | Gravell | 148/246 |
| 2,400,573 | 5/1946 | Prutton | 148/246 |
| 2,935,432 | 5/1960 | Schuster et al. | |
| 3,775,323 | 11/1973 | Dubourg | 148/246 |
| 3,899,364 | 8/1975 | Evans | 148/246 |
| 3,982,968 | 9/1976 | Billigmann | 148/246 |
| 4,536,228 | 8/1985 | Treharne | 148/6.15 R |
| 4,594,294 | 6/1986 | Eichen et al. | 428/552 |
| 4,698,269 | 10/1987 | Narusch, Jr. et al. | |
| 4,716,083 | 12/1987 | Eichen et al. | 428/552 |

FOREIGN PATENT DOCUMENTS

| | | |
|---|---|---|
| 60-121278 | 6/1985 | Japan . |
| 60-97450 | 7/1985 | Japan . |
| 60-149557 | 10/1985 | Japan . |
| 60-194085 | 10/1985 | Japan . |
| 61-207578 | 9/1986 | Japan . |
| 1-121389 | 5/1989 | Japan . |
| 88592 | 3/1986 | Romania . |

OTHER PUBLICATIONS

JIS Z 2371–1988 Japanese Industrial Standard Methods of Neutral Salt Spracy Testing, pp. 1–25.

*Primary Examiner*—Sam Silverberg
*Attorney, Agent, or Firm*—W. G. Fasse; W. F. Fasse

[57] ABSTRACT

A gear for wheel speed detection or sensor ring has a low cost and an excellent corrosion resistance. The sensor ring is mainly made of sintered stainless steel. A surface layer of the sensor ring contains at least 5 atomic % and not more than 25 atomic % of phosphorus, at least 30 atomic % and not more than 70 atomic % of oxygen, and at least 5 atomic % and not more than 50 atomic % of iron, and at least partially consists of an amorphous phase. The surface layer is formed by dipping a sintered stainless steel product in oil at a temperature of 15° to 70° C. containing phosphoric acid groups.

14 Claims, 5 Drawing Sheets

FIG. 1C
FIG. 1A
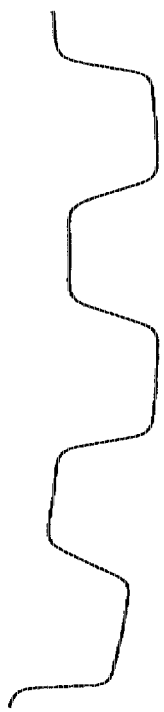
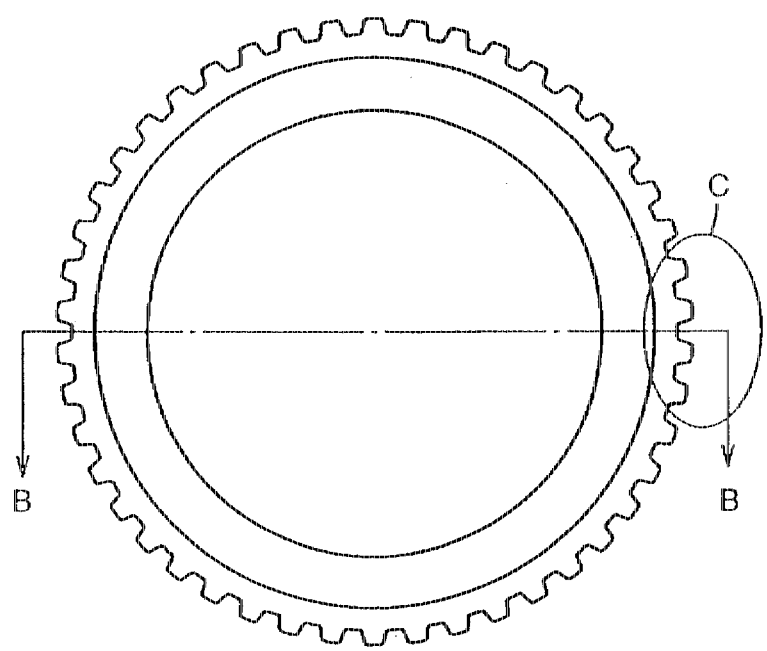
FIG. 1B

GEAR FOR WHEEL SPEED DETECTION AND METHOD OF MANUFACTURING THE SAME

FIELD OF THE INVENTION

The present invention relates to a gear for wheel speed detection (hereinafter referred to as a sensor ring) which can be used in an electronically controlled anti-locking brake system (hereinafter referred to as ABS) for an automobile and a method of manufacturing the same.

BACKGROUND ART

In recent years, developments have been made toward the improved safety and the high reliability of a disc brake system for an automobile, due to the increasing social requirements for the improved stability of an automobile. Due to the rapid development and cost reduction of microelectronics, in particular, it is now becoming prevalent to provide an ABS for preventing the wheels of an automobile from slipping during abrupt braking on frozen or wet pavement for preventing an accident. However, the components of the ABS must be cost economical in addition to having a high performance and reliability, and there still remain a number of problems to be solved.

As to a wheel speed detecting component that is the core of the ABS, an electromagnetic system having excellent environmental resistance is now being used. A sensor ring of a magnetic material having a gear shaped surface of high gear tooth pitch accuracy is employed for this detecting system. FIG. 1A is a front elevational view of a sensor ring, FIG. 1B is a sectional view taken along the line B—B in FIG. 1A, and FIG. 1C is an enlarged view showing a portion C in FIG. 1A. FIG. 2 is a diagram showing an operation principle of electromagnetic wheel speed detection utilizing the sensor ring shown in FIG. 1A.

As shown in FIG. 2, the sensor ring 1 is mounted on a wheel to have a constant clearance between a pole piece 3 of a sensor coil 2 and each tip of the sensor ring 1. The electromagnetic coil 2 receives the magnetic flux change which is caused in the changing clearance between the coil 2 and the successive tips and grooves of the gear teeth during rotation of the wheel. The coil 2 correspondingly generates an excited output voltage 5 which can be detected to correctly read the speed of each wheel. The ABS correctly operates on the basis of the measured speed of each wheel to control the brake on that wheel so that the wheel does not become locked and will not slip.

The material for this sensor ring must have excellent corrosion resistance in addition to excellent magnetic properties as output characteristics and high pitch accuracy of the gear teeth. A drive shaft direct mounting system for the sensor ring is preferred. The drive shaft direct mounting type is so simple in structure that the sensor ring can be mounted and maintained easily and at a low cost. In such a drive shaft direct mounting type sensor ring, however, the surface of the sensor ring is exposed to the exterior environment Therefore, the requirement of corrosion resistance for the sensor ring is so high that a sensor ring having a suitable corrosion resistance has not yet been obtained. Namely, a sensor ring material cannot be used in practice unless it can withstand salt water corrosion caused by salt that is spread.

In response to the aforementioned requirement for corrosion resistance, ingot metallurgical stainless steel was first regarded as a possible material for the sensor ring. However, because a high dimensional accuracy is required for the sensor ring, a substantial material loss results from machining work if ingot metallurgical stainless steel is employed, which increase the working cost. Therefore, it is rather advantageous to employ a ferrous sintered material which can be formed to reduce the material loss, and thereby ensure dimensional accuracy at a low cost.

As to the sintered material, sintered stainless steel itself having corrosion resistance has been employed, or a ferrous sintered material provided with corrosion resistance by a surface treatment or sintered stainless steel subjected to surface corrosion resistance treatment has been studied. However, pores are present in any sintered material. When a surface treatment such as plating treatment is performed on the surface of such a sintered material, therefore, the plating liquid penetrates into the pores and then disadvantageously exudes onto the surface, or remains in the interior of the material, which causes rust. In order to seal the pores of the sintered material, therefore, a sealing treatment by impregnation with resin, copper infiltration or steam treatment, which has been used for machine parts, has also been studied. However, there have been problems caused by such surface treatments, such as an increase in the manufacturing cost and a deterioration of all the output voltage characteristics.

In order to cover only the surface without employing a solution, it has been proposed and put into practice to combine the so-called DECROTIZE treatment (registered trademark) for bonding zinc powder with a chromate anhydride binder with a steam sealing treatment of a base. When such a surface treatment is performed, however, the coating layer may become separated during use similarly to a plating treatment, and thus cannot attain the object of corrosion resistance. Even if such a coating layer is separated, it is possible to attain the object of corrosion resistance by preparing the base from sintered stainless steel. When the base is prepared from sintered stainless steel and subjected to the aforementioned surface treatment, however, the manufacturing cost is increased in both the material and the working steps, and it is difficult to industrially produce the sensor ring.

As hereinabove described, the conventional sensor rings have various problems, and a material for a sensor ring which has a lower cost and a higher corrosion resistance has been sought heretofore in the art.

SUMMARY OF THE INVENTION

Accordingly, an object of the present invention is to provide a gear for wheel speed detection which has a lower cost and a superior corrosion resistance, and a method of manufacturing the same.

The inventive gear for wheel speed detection has a surface layer containing at least 5 atomic % and not more than 25 atomic % of phosphorus, at least 30 atomic % and not more than 70 atomic % of oxygen, and at least 5 atomic % and not more than 50 atomic % of iron, and at least partially consisting of an amorphous phase, with a rest which is mainly made of sintered stainless steel.

According to the inventive method of manufacturing a gear for wheel speed detection, raw material powder is compacted and thereafter sintered for preparing a sintered stainless steel product. This sintered stainless steel product is dipped in oil of a temperature of at least 15° C. and not more than 70° C. containing phosphoric acid groups. Thus, a surface layer containing at least 5 atomic % and not more than 25 atomic % of phosphorus, at least 30 atomic % and not more than 70 atomic % of oxygen, and at least 5 atomic % and not more than 50 atomic % of iron and at least partially consisting of an amorphous phase is formed on the sintered stainless steel product.

According to a preferred method of manufacturing a gear for wheel speed detection in the present invention, the oil containing phosphoric acid groups is employed as a lubricating oil for corrective sizing, to improve the manufacturing efficiency of the gear for wheel speed detection by continuously carrying out dipping in the oil and corrective sizing.

As to the composition of the material, the sintered stainless steel product serving as the main material for the sensor ring according to the present invention may simply have magnetism and ductility similar to electromagnetic stainless steel. For example, a ferrite system or martensite system material consisting of 7 to 27% of chromium in weight ratio and a rest of iron and unavoidable impurities, or a material prepared by adding not more than 5% of molybdenum and not more than 2% of silicon thereto is preferable with regard to the magnetic properties of the material.

Sintered stainless steel is superior in corrosion resistance to an ordinary ferrous sintered material having a small content of chromium or nickel, due to the rust preventing action of a dense oxide film of a surface layer. However, sintered stainless steel is inferior in corrosion resistance to ingot metallurgical stainless steel, due to the presence of pores in the sintered product.

In the sintered stainless steel, further, the surface layer rusts easily due to a loss of chromium from the surface layer during sintering. In order to put a sensor ring of sintered stainless steel into practice, therefore, it is necessary to form a coating layer which is excellent in corrosion resistance to such a degree that it can withstand salt water and which has a strong adhesion to a base material.

In order to improve the corrosion resistance of the aforementioned sintered stainless steel, the inventors have determined that the corrosion resistance can be improved by dipping the sintered stainless steel in oil of a prescribed temperature containing phosphoric acid groups so as to bring a surface layer of the sintered product into a prescribed composition.

The inventive sensor ring which is mainly made of sintered stainless steel may be manufactured by the basic steps shown in FIG. 3. First, respective powder materials are prepared as raw materials for sintered stainless steel. These powder materials are mixed with each other and compacted into a prescribed shape. The obtained compact is then sintered. The obtained sintered body then dipped in an oil reservoir, so that the surface of the sintered body is coated with oil containing prescribed phosphoric acid groups. Thereafter the sintered body is sized with a die of a prescribed shape, to be finished in the form of a ring having a gear-toothed perimeter as shown in FIG. 1. Then, the oil is completely removed by degreasing, to obtain the sensor ring as a finished product.

Dipping the sintered body in the oil containing phosphoric acid groups may be carried out immediately after the sintering, or may be carried out during the sizing by using the oil as a lubricating oil. A similar effect can also be attained by carrying out the treatment of dipping in the oil containing phosphoric acid groups after the sizing. The temperature of the oil is preferably at least 15° C. and not more than 70° C. If the temperature of the oil is less than 15° C., the viscosity of the oil is disadvantageously high so that it is difficult for the oil to permeate into pores from the surface layer. If the temperature of the oil exceeds 70° C., on the other hand, the amount of oil adhering to the surface layer is disadvantageously low so that the lubricating effect is reduced when the sizing is continuously carried out. A sufficient duration for the treatment of dipping in the oil is within several minutes at the most, and a stable surface layer is generally formed within 1 minute.

When the surface of sintered stainless steel treated in the aforementioned manner is analyzed by X-ray diffraction and ESCA (electron spectroscopy for chemical analysis), a compound layer which is mainly composed of phosphorus, iron and oxygen and partially consists of an amorphous phase is detected on its surface layer. When a salt spray corrosion test by JIS-Z2371 is carried out on the treated sintered stainless steel, the development of reddish rust on the surface is extremely small as compared with an untreated sample, as shown in the examples described later. When the sensor ring is mounted on a wheel to measure its output voltage characteristics, further, it is found that the deterioration of its characteristics is also extremely small. This is conceivably because the aforementioned surface layer which is formed by reaction between the heated oil containing phosphoric acid groups and the base material of sintered stainless steel forms a waterproof and acidproof passive state, whereby the surface layer is chemically stabilized.

In the composition of the surface layer, the phosphorus content is 5 to 25 atomic %, the oxygen content is 30 to 70 atomic % and the iron content is 5 to 50 atomic %, because if the composition is out of those ranges, then a desirable coat having an amorphous phase will not be formed or the rust preventing effect will be reduced. Reduction of the rust preventing effect is conceivably influenced by the proportions of an amorphous phase and a crystalline phase, and a reduction of the corrosion resistance is conceivably influenced the formation of iron hydroxide etc. caused by the incorporation of impurities or moisture etc.

When the stainless steel compact is vacuum-sintered, the chromium concentration is reduced in surface grain boundaries and in pore surfaces due to the vaporization of chromium components under in the vacuum. In a sintered state, therefore, acid resistance and water resistance is reduced in these areas. When a surface treatment is performed in accordance with the present invention, however, the aforementioned passive state layer is formed on the surface of the sintered stainless steel, so that the acid resistance and the water resistance are even improved in vacuum-sintered stainless steel.

The as-formed surface layer becomes a dense and fine layer. This layer is formed by the partial change of components of the sintered stainless steel due to chemical reaction in the surface layer, and thus does not detrimentally reduce the adhesion at the interface between the surface layer and the base material, dissimilarly to a plating layer and a DECROTIZE layer.

Further, the aforementioned surface layer can be formed by a treatment that is simpler and less costly and does not require high-priced equipment, as compared with a conventional surface treatment method. Further, the treatment is performed in a short time, whereby continuation and automation of the process are also made possible.

In particular, the oil which is employed in forming the surface layer may be applied as lubricating oil for corrective sizing. In this case, the surface treatment is enabled simultaneously with the sizing, and the surface reaction is caused by employing the temperature increase of the sintered body in the sizing as such. Thus, continuation of the manufacturing steps is simplified and the productivity is improved.

While the present invention will be described below with reference to particular examples, the inventive sensor ring and the method of manufacturing it are not restricted to these examples.

BRIEF DESCRIPTION OF THE DRAWINGS

FIGS. 1A, 1B and 1C are a front elevational view, a sectional view and an enlarged view showing an example of a gear for wheel speed detection (sensor ring) as is generally known, but especially treated according to the present invention.

Figure 2:
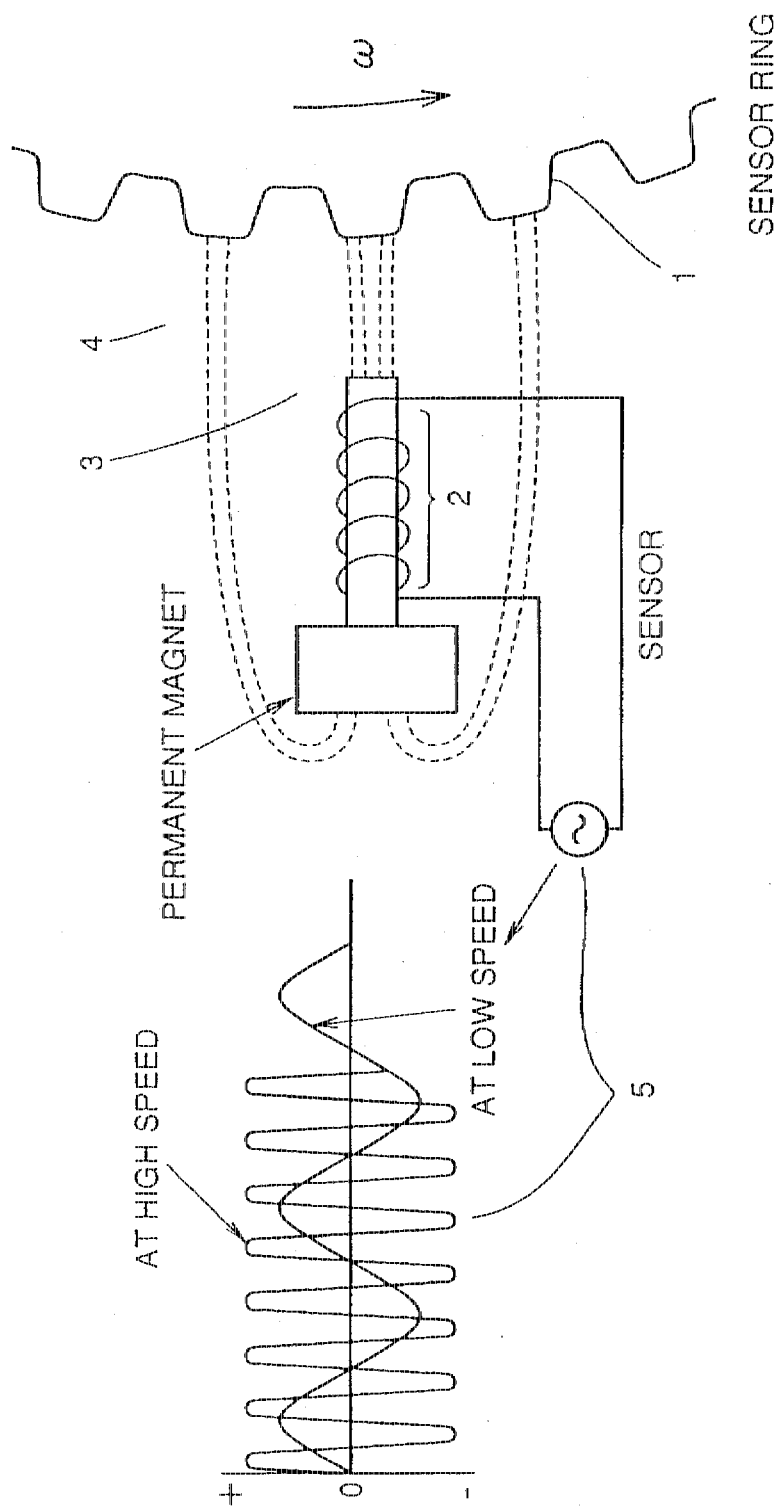
FIG. 2 typically illustrates an operation principle of electromagnetic wheel speed detection utilizing the sensor ring.
Figure 3:
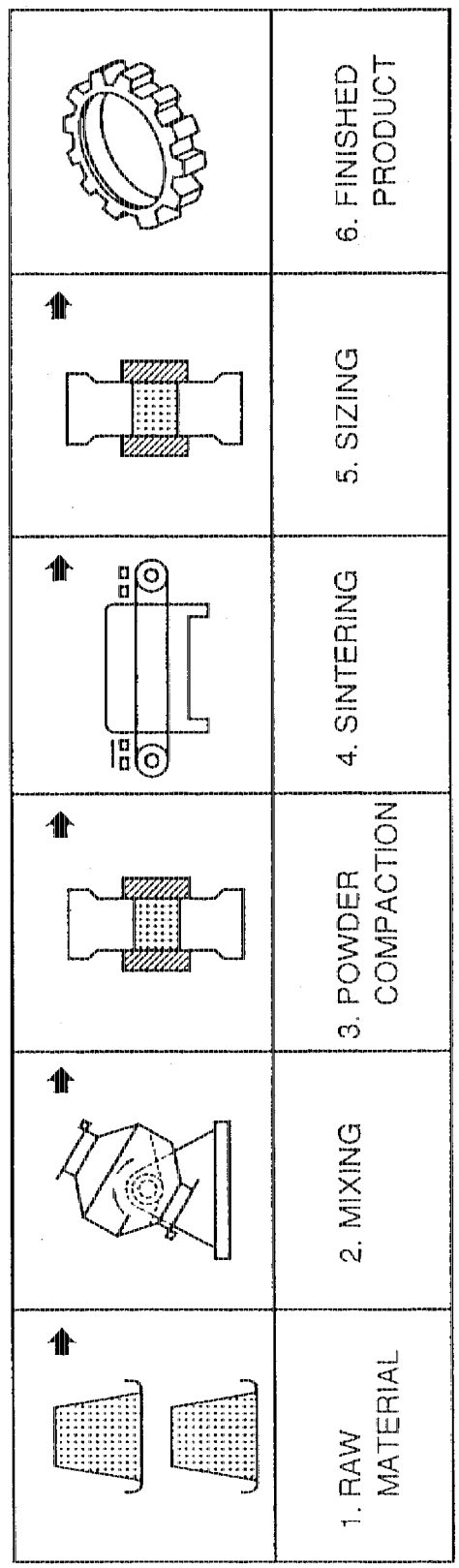
FIG. 3 is a process sequence diagram showing steps of manufacturing the sensor ring according to the present invention.

DETAILED DESCRIPTION OF PREFERRED EXAMPLES AND OF THE BEST MODE FOR CARRYING OUT THE INVENTION

Example 1

Five types of samples, i.e. sample Nos. 1 to 5, were prepared for each of a ring-shaped product (shape A) of 40 mm in outer diameter, 25 mm in inner diameter and 5 mm in thickness, and a sensor ring-shaped product (shape B) of 90 mm in outer diameter, 84 mm in inner diameter and 10 mm in thickness with 44 external teeth, as shown in Table 1. Compositions of the base materials of the respective samples, the methods of manufacturing the base materials and the surface treatment methods are also shown in Table 1.

TABLE 1

| Sample No. | Composition of Base Material | Method of Preparing Base Material | Time of Treatment | Treatment Temperature | Treatment Time |
|---|---|---|---|---|---|
| 1 | Corresponding to SUS434 | Sintering (Vacuum Sintered) | Immediately after Sintering | 50° C. | 1 min. |
| 2 | Corresponding to SUS434 | Sintering (Vacuum Sintered) | Immediately before Sizing | 50° C. | 1 min. |
| 3 | Corresponding to SUS434 | Sintering (Vacuum Sintered) | Immediately after Sizing | 50° C. | 1 min. |
| 4 | Corresponding to SUS434 | Sintering (Vacuum Sintered) | | No | |
| 5 | Corresponding to SUS434 | Ingot Metallurgy (Machined) | | No | |
| 6 | Corresponding to SUS430 | Sintering (Vacuum Sintered) | Immediately after Sintering | 50° C. | 1 min. |
| 7 | Corresponding to SUS430 | Sintering (Vacuum Sintered) | Immediately before Sizing | 50° C. | 1 min. |
| 8 | Corresponding to SUS430 | Sintering (Vacuum Sintered) | Immediately after Sizing | 50° C. | 1 min. |
| 9 | Corresponding to SUS430 | Sintering (Vacuum Sintered) | | No | |
| 10 | Corresponding to SUS430 | Ingot Metallurgy (Machined) | | No | |
| 11 | Improved SUS434 | Sintering (Vacuum Sintered) | Immediately before Sizing | 50° C. | 1 min. |
| 12 | Improved SUS434 | Sintering (Vacuum Sintered) | Immediately after Sizing | 50° C. | 1 min. |
| 13 | Improved SUS434 | Sintering (Vacuum Sintered) | | No | |
| 14 | Corresponding to SUS434 | Sintering (Hydrogen Sintered) | Immediately before Sizing | 50° C. | 1 min. |
| 15 | Corresponding to SUS434 | Sintering (Hydrogen Sintered) | Immediately after Sizing | 50° C. | 1 min. |
| 16 | Corresponding to SUS434 | Sintering (Vacuum Sintered) | Immediately before Sizing | 90° C. | 1 min. |
| 17 | Corresponding to SUS434 | Sintering (Vacuum Sintered) | Immediately before Sizing | 150° C. | 1 min. |
| 18 | Corresponding to SUS434 | Sintering (Vacuum Sintered) | Immediately before Sizing | 50° C. | 30 min. |
| 19 | Corresponding to SUS434 | Sintering (Vacuum Sintered) | Immediately before Sizing | 50° C. | 60 min. |

Note) The improved SUS434 material is an Fe - 18 Cr - 2 Mo - 1 Si alloy.
When a sample of the same composition/manufacturing method as the sample No. 16 was subjected to a surface treatment at a temperature of 13° C., substantially no amorphous phase was formed on its surface.

The samples Nos. 1 to 4 were molded into prescribed shapes utilizing alloy powder materials corresponding to SUS434. The samples No. 5 were cut from a block of ingot alloy steel corresponding to SUS434 and worked into prescribed shapes.

A salt spray test was carried out by a method defined in JIS-Z2371, in order to examine the corrosion resistance as to both of the shapes A and B. In particular for the shape A, the extent of development of reddish rust was observed after 72 hours, 240 hours and 500 hours in comparison to the condition before the test. As to the shape B, a sensor test was carried out on the samples before the salt spray test, after 240 hours and after 500 hours under conditions of a rotation speed of 40 rpm and a clearance of 0.1 mm between a pole piece and each tip, to measure characteristic values of output voltages. Table 2 shows the results.

TABLE 2

| Sample No. | Salt Spray Test (Shape A Sample) | | | Sensor Output Voltage Characteristics (Shape B Sample) | | | |
|---|---|---|---|---|---|---|---|
| | After 72 Hours | After 240 Hours | After 500 Hours | Before Test | After 240 Hours | After 500 Hours | Deterioration Rate after 500 Hours |
| 1 | 1.5% | 3% | 3.5% | 332 mVpp | 332 mVpp | 330 mVpp | 0.6% |
| 2 | 1 | 2 | 3 | 334 | 333 | 329 | 1.5 |
| 3 | 2 | 4 | 5 | 333 | 333 | 331 | 0.6 |
| 4 | 5 | 80 | 90 | 335 | 300 | 280 | 16.4 |
| 5 | 1 | 6 | 8 | 370 | 364 | 360 | 2.7 |
| 6 | 1.5 | 2 | 5 | 319 | 319 | 317 | 0.6 |
| 7 | 1.5 | 2 | 4 | 321 | 320 | 319 | 0.6 |
| 8 | 1 | 2 | 6 | 322 | 320 | 316 | 1.9 |
| 9 | 8 | 80 | 95 | 320 | 294 | 269 | 15.9 |
| 10 | 2 | 8 | 12 | 365 | 356 | 354 | 3.0 |
| 11 | 0 | 0 | 1.5 | 317 | 318 | 316 | 0.3 |
| 12 | 0 | 1 | 1.5 | 316 | 316 | 314 | 0.6 |
| 13 | 3 | 40 | 60 | 318 | 317 | 315 | 0.9 |
| 14 | 1.5 | 4 | 8 | 330 | 327 | 321 | 2.7 |
| 15 | 1.5 | 5 | 10 | 329 | 328 | 317 | 3.6 |
| 16 | 0 | 1 | 2 | 335 | 334 | 334 | 0.3 |
| 17 | 0 | 1 | 1.5 | 330 | 329 | 328 | 0.6 |
| 18 | 1 | 1.5 | 3 | 332 | 330 | 329 | 0.9 |
| 19 | 1 | 1.5 | 2 | 334 | 334 | 333 | 0.3 |

Note) Numerical values in the salt spray test show areas of rusted surfaces with respect to surface areas of the shape A samples. The sensor output voltage characteristic values are effective voltage values (mV) output by the sensors, and deterioration rates show the reduction rates of the effective voltage values measured after 500 hours with respect to those before the test.

Figure 4:
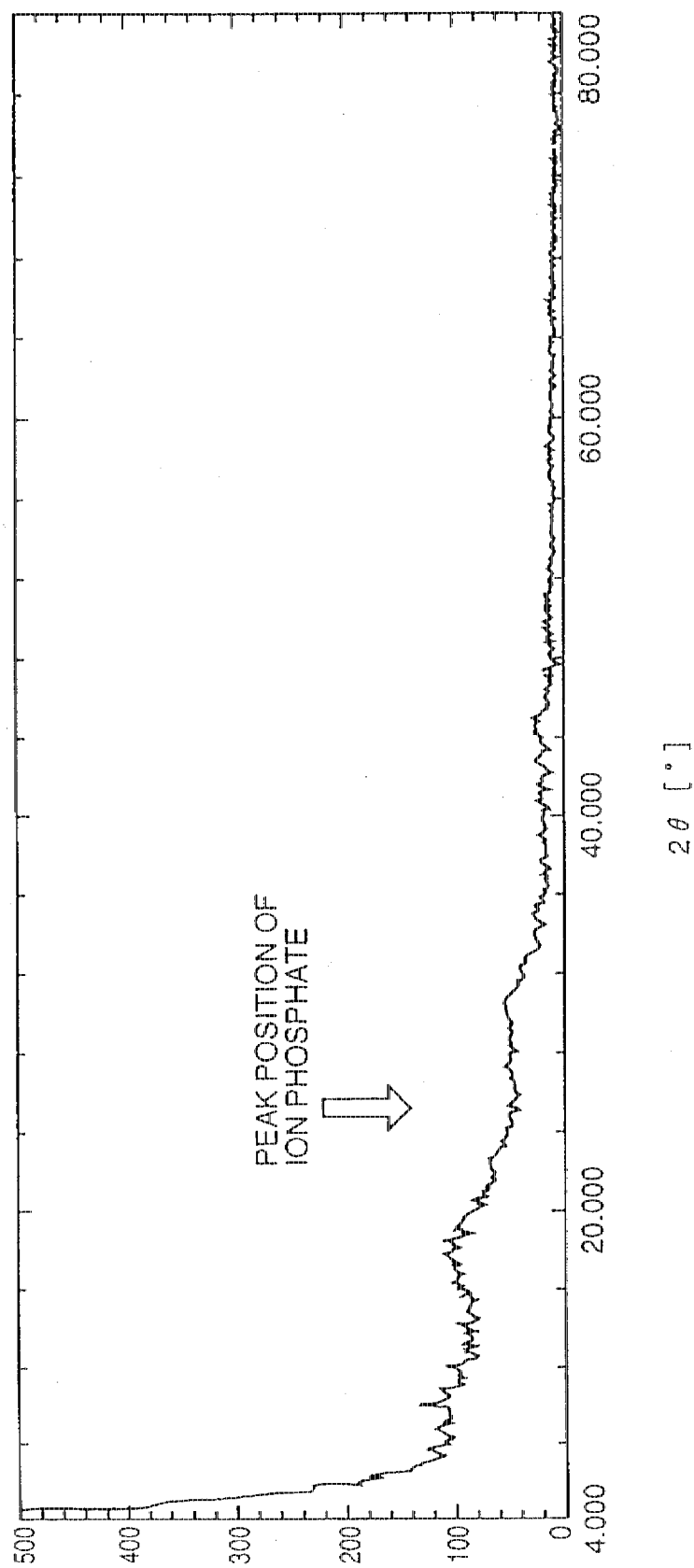
FIG. 4 is a graph showing a result of X-ray diffraction of a surface layer of a sensor ring member according to the present invention.
Figure 5A:
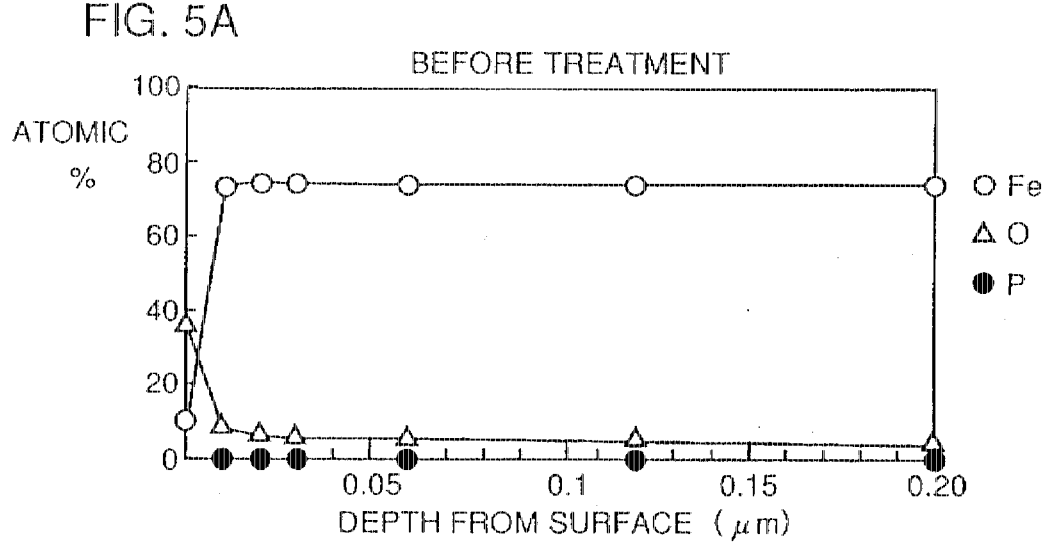
FIGS. 5A, 5B and 5C are graphs showing results of ESCA analysis of the surface layer of the sensor ring member according to the present invention.
Figure 5B:
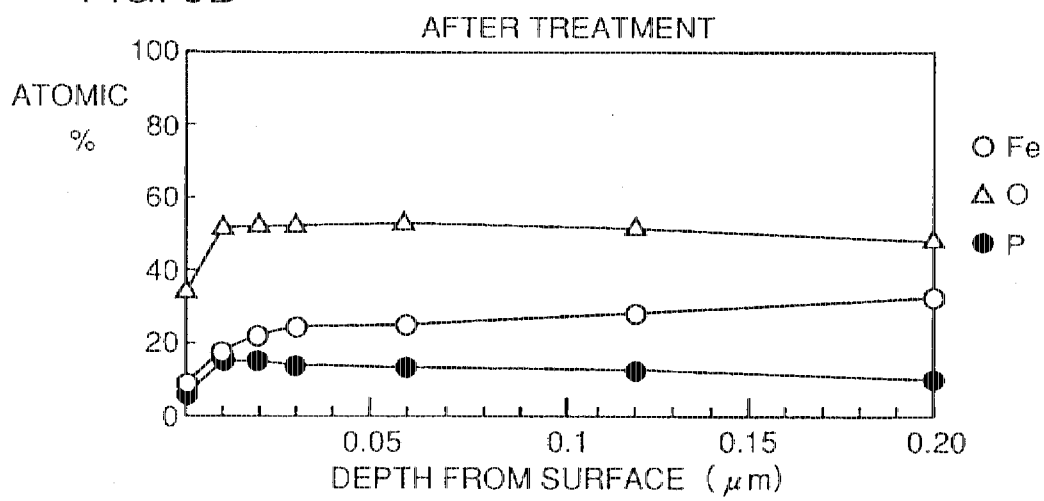
Figure 5C:
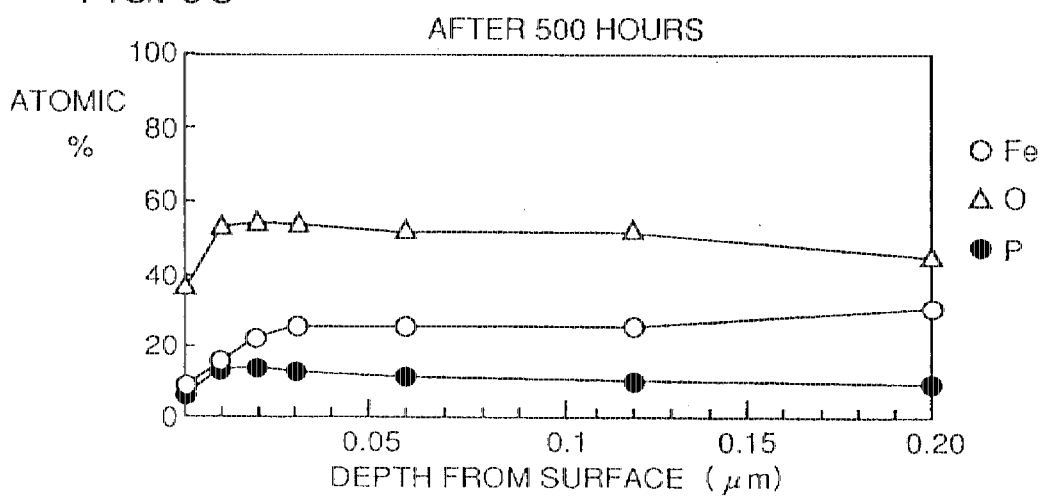

On the other hand, an analysis sample was cut from the shape A specimen of the sample No. 2, and was subjected to an identification of the composition components of the surface layer and an elementary analysis. The result of X-ray diffraction is shown in FIG. 4, and the results of analysis by ESCA are shown in FIGS. 5A to 5C. Table 3 shows numeric data corresponding to FIGS. 5A to 5C.

TABLE 3

| Sample | Element | (ESCA Atomic %) Depth from Surface (μm) | | | | | | |
|---|---|---|---|---|---|---|---|---|
| | | 0 | 0.01 | 0.02 | 0.03 | 0.06 | 0.12 | 0.20 |
| Untreated | Fe | 10 | 73 | 74 | 73 | 72 | 73 | 74 |
| | O | 38 | 9 | 7 | 6 | 5 | 5 | 5 |
| | P | 0 | 0 | 0 | 0 | 0 | 0 | 0 |
| After Treatment | Fe | 8 | 18 | 22 | 24 | 25 | 28 | 33 |
| | O | 33 | 52 | 53 | 54 | 55 | 52 | 48 |
| | P | 7 | 16 | 15 | 13 | 13 | 12 | 10 |
| After 500 Hours from Salt Spray | Fe | 7 | 16 | 22 | 25 | 26 | 27 | 31 |
| | O | 38 | 54 | 55 | 55 | 54 | 53 | 46 |
| | P | 6 | 14 | 14 | 13 | 12 | 12 | 10 |

The oil containing phosphoric acid groups was prepared by adding a surface active agent to a mixture containing about 10% of phosphoric acid groups, about 20% of fatty acid salt and about 40% of mineral oil. Dipping in the oil containing phosphoric acid groups was performed at a temperature of 50° C. for 1 minute.

As obvious from Table 2, it was recognized as to the sample No. 4, which was not surface treated, that corrosion by reddish rust progressed remarkably from the condition at a time after 240 hours to that after 500 hours as compared with the samples Nos. 1 to 3, which were subjected to oil dipping after vacuum sintering. Also as to the sensor output voltage characteristics, it is understood that the sample No. 4 was extremely deteriorated, i.e. 16.4% deterioration, while the samples Nos. 1 to 3 exhibited deterioration rates of only 0.6 to 1.5% after 500 hours. Comparing the deterioration rates after 500 hours in the sensor output characteristic test, it is understood that substantially no deterioration of the output voltages was recognized as to the samples Nos. 1 to 3, which maintained their original or initial condition having substantially no reddish rust, while in sample No. 4 the formation and spreading of reddish rust the surface progressed as compared with the initial state which lead to the deterioration of the output voltage.

On the other hand, the samples No. 5 exhibited large values as to both the extent of development of reddish rust after the salt spray test and as to the deterioration of the sensor output, as compared with the samples Nos. 1 to 3.

Referring to FIG. 4, it is understood from the result of X-ray diffraction on the surface layer of the surface-treated sample No. 2, that the surface layer mainly consisted of an amorphous phase. An arrow in FIG. 4 shows a peak position of iron phosphate, which may conceivably be formed by reaction between the phosphoric acid groups contained in the oil and components of the sintered stainless steel actually observed.

Referring to FIGS. 5A to 5C, it is understood that the surface layer mainly consisting of the as-formed amorphous phase remains substantially soundly even 500 hours after the salt spray test, as shown by the results of ESCA analysis of the elements, i.e., iron, oxygen and phosphorus forming the sample No. 2 in a depth of up to 0.2 μm from the surface. FIGS. 5A, 5B and 5C show the results of analysis of the surface layer before the surface treatment, after the surface treatment, and after 500 hours of the salt spray test.

Example 2

14 types of samples, i.e., sample Nos. 6 to 19, were prepared for each of shapes A and B which were similar to those in Example 1, as shown in Table 1. This Table also shows the compositions of base materials, the manufacturing methods and the surface treatment conditions as to the respective samples. Oil containing phosphoric acid groups for surface treatment was prepared similarly to that in Example 1.

As to the shapes A and B, corrosion resistance values of the samples Nos. 6 to 19 were examined by a method similar to that in Example 1. The results are shown in Table 2.

From the samples Nos. 6 to 8 and Nos. 9 and 10, it is understood that the effect of the present invention is also achieved in the SUS430 alloy, which has a lower and inferior corrosion resistance as compared to the SUS434 alloy.

From the samples Nos. 11 and 12 and No. 13, it is understood that the improved corrosion resistance according to the present invention can also be achieved in the improved SUS434 alloy that is prepared by adding Mo and Si to the SUS434 alloy for improving its corrosion resistance.

From the samples Nos. 14 and 15, it is understood that the effect of the present invention is also achieved as to the SUS434 alloy that was sintered in an atmosphere of gaseous hydrogen in order to avoid evaporation of Cr that usually occurs in vacuum sintering. It is conceivable that a gaseous hydrogen sintered product is inferior in corrosion resistance to a vacuum sintered product because an oxide of chromium was not sufficiently reduced in the gaseous hydrogen under the sintering temperature condition in this Example.

The samples Nos. 16 and 17 attained preferable results in corrosion resistance of the surfaces, but lubrication effects were reduced when a number of sizing steps were carried out with ring shapes having the same sizes as the samples B, because the oil for surface treatment was at a high temperature, and some samples caused partial seizure of the die.

Finally, it was noted that the effect of corrosion resistance remains unchanged even if the dipping is carried out for at least 30 minutes as in the samples Nos. 18 and 19. Considering efficiency, the corrosion resistance effect remains unchanged even if the time is within several minutes, generally within 1 minute. As to the time for best performing the surface treatment, the improved corrosion resistance is not affected by carrying out the treatment immediately after the sintering or immediately before or after the sizing.

According to the present invention, as hereinabove described, it is possible to obtain a gear for wheel speed detection that is mainly made of sintered stainless steel, and that has excellent corrosion resistance as a result of carrying out a prescribed surface treatment. The equipment for carrying out the inventive manufacturing method, is simpler than that for other surface treatment methods, the present treatment steps are extremely simple to enable continuation of the process, and the manufacturing cost can be reduced. In particular, it is possible to manufacture a gear for wheel speed detection at a lower cost by using the oil which is employed for the surface treatment of the present invention also as a lubricating oil for carrying out dimensional corrective sizing.

Although the invention has been described with reference to specific example embodiments, it will be appreciated that it is intended to cover all modifications and equivalents within the scope of the appended claims.

We claim:

1. A method of manufacturing an article that is mainly made of sintered stainless steel, comprising:

a) molding a raw material powder;

b) sintering said molded powder to prepare a sintered stainless steel product; and c) increasing a corrosion resistance of said sintered stainless steel product by bringing said sintered stainless steel product into contact with an oil mixture, being at a temperature of at least 15° C. and not more than 70° C., and containing phosphoric acid groups, thereby forming on said sintered stainless steel product a surface layer containing at least 5 atomic % and not more than 25 atomic % of phosphorus, at least 30 atomic % and not more than 70 atomic % of oxygen, and at least 5 atomic % and not more than 50 atomic % of iron and at least partially consisting of an amorphous phase.

2. The method of claim 1, further comprising performing a corrective sizing step on said sintered stainless steel product, wherein said step c) is performed during said corrective sizing step, wherein said oil is used as a lubricating oil for said corrective sizing step.

3. The method of claim 2, wherein said step c) and said corrective sizing step are carried out continuously together.

4. The method of claim 1, further comprising performing a corrective sizing step on said sintered stainless steel product, wherein said step c) is performed immediately before said corrective sizing step.

5. The method of claim 1, further comprising performing a corrective sizing step on said sintered stainless steel product, wherein said step c) is performed after said corrective sizing step.

6. The method of claim 1, wherein said step c) is performed immediately after said sintering step b).

7. The method of claim 1, wherein said sintered stainless steel product includes surface and internal pores after said sintering step b), and wherein said contact with said oil in said step c) is carried out in such a manner that said oil penetrates into said pores thereby forming said surface layer around said pores.

8. The method of claim 1, wherein said contact with said oil in said step c) is maintained for a time not longer than about 1 minute.

9. The method of claim 1, wherein said temperature of said oil is about 50° C.

10. The method of claim 1, wherein said sintering step b) is carried out under a vacuum.

11. The method of claim 1, wherein said sintering step b) is carried out under a gaseous hydrogen atmosphere.

12. The method of claim 1, wherein said oil contains about 10% phosphoric acid groups, about 20% fatty acid salt, and about 40% mineral oil.

13. The method of claim 7, further comprising performing a corrective sizing step on said sintered stainless steel product, wherein said step c) is performed during said corrective sizing step, wherein said oil is used as a lubricating oil for said corrective sizing step.

14. The method of claim 1, wherein said contact with said oil in said step c) is maintained for a time not longer than about one minute.

* * * * *

UNITED STATES PATENT AND TRADEMARK OFFICE
CERTIFICATE OF CORRECTION

PATENT NO. : 5,714,016
DATED : Feb. 3, 1998
INVENTOR(S) : Ueda et al.

It is certified that error appears in the above-identified patent and that said Letters Patent is hereby corrected as shown below.

On the title page, under [75] Inventors, line 2, after "of" delete "Itami" and instead insert --Itami-shi--;

under [30] Foreign Application Priority Data,
line 2, before "[JP]" delete "Sep. 29, 1993" and instead insert --Sep. 30, 1992--;

under [56] References Cited,
line 5, after "8/1975" delete "Evans" and instead insert --Evans et al.--;
line 6, after "9/1976" delete "Billigmann" and instead insert --Billigmann et al.--;

| Col. 1, | line 21, | after "pavement" insert --,--; |
| | line 46, | after "wheel" insert --,--; |
| | line 57, | after "environment" insert --.--; |
| | line 62, | after "spread" insert --on the road--; |
| Col. 2, | line 2, | after "which" delete "increase" and instead insert --increases--; |
| Col. 3, | line 48, | after "body" insert --is--; |

UNITED STATES PATENT AND TRADEMARK OFFICE
CERTIFICATE OF CORRECTION

PATENT NO. : 5,714,016

DATED : Feb. 3, 1998

INVENTOR(S) : Ueda et al.

It is certified that error appears in the above-identified patent and that said Letters Patent is hereby corrected as shown below.

Col. 4, line 31, after "enced" insert --by--;
line 36, after "components" delete "under";

Col. 7, delete lines 54 to 59 and instead insert the following:

TABLE 3

(ESCA Atomic %)

| Sample | Element | Depth from Surface (μm) 0 | 0.01 | 0.02 | 0.03 | 0.06 | 0.12 | 0.20 |
|---|---|---|---|---|---|---|---|---|

Col. 8, delete lines 1 to 8 and instead insert the following:

TABLE 3

(ESCA Atomic %)

| Sample | Element | Depth from Surface (μm) 0 | 0.01 | 0.02 | 0.03 | 0.06 | 0.12 | 0.20 |
|---|---|---|---|---|---|---|---|---| line 62, after "state" insert --,--;

UNITED STATES PATENT AND TRADEMARK OFFICE
CERTIFICATE OF CORRECTION

PATENT NO. : 5,714,016
DATED : Feb. 3, 1998
INVENTOR(S) : Ueda et al.

It is certified that error appears in the above-identified patent and that said Letters Patent is hereby corrected as shown below.

| | | |
|---|---|---|
| Col. 9, | line 7, | after "steel" insert --, no peak showing a crystal state was --; |
| Col. 10, | line 4, | after "method" delete ","; |
| | line 17, | after "manufacturing" delete "an article" and instead insert --a gear for wheel speed detection--; |
| Col. 12, | line 2, | after "time" delete "not longer than" and instead insert --up to several minutes.--; |
| | line 3, | delete "about one minute.". |

Signed and Sealed this

Twenty-third Day of June, 1998

Attest:

BRUCE LEHMAN

*Attesting Officer*  *Commissioner of Patents and Trademarks*